United States Patent
Iwao et al.

(10) Patent No.: US 8,308,610 B2
(45) Date of Patent: Nov. 13, 2012

(54) DEVICE FOR CONTROLLING A POWER TRANSMISSION DEVICE OF A VEHICLE AT THE TIME OF GEARSHIFT

(75) Inventors: Nobuyuki Iwao, Kanagawa (JP); Hiroshi Usuba, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 783 days.

(21) Appl. No.: 12/312,724

(22) PCT Filed: Nov. 19, 2007

(86) PCT No.: PCT/JP2007/072375
§ 371 (c)(1),
(2), (4) Date: May 22, 2009

(87) PCT Pub. No.: WO2008/065922
PCT Pub. Date: Jun. 5, 2008

(65) Prior Publication Data
US 2010/0062898 A1    Mar. 11, 2010

(30) Foreign Application Priority Data

Nov. 27, 2006   (JP) ................................. 2006-318454

(51) Int. Cl.
*B60W 10/04* (2006.01)
*B60W 10/10* (2012.01)
(52) U.S. Cl. .......................................... 477/107; 477/77
(58) Field of Classification Search .................... 477/77, 477/79, 107–111, 166, 174, 175, 181
See application file for complete search history.

(56) References Cited

U.S. PATENT DOCUMENTS

| | | | |
|---|---|---|---|
| 5,568,748 A * | 10/1996 | Carlson et al. | 74/336 R |
| 5,983,740 A | 11/1999 | Salecker et al. | |
| 6,009,967 A * | 1/2000 | Hrovat | 180/197 |
| 6,058,792 A * | 5/2000 | Kosik et al. | 74/335 |
| 6,551,213 B2 | 4/2003 | Suzuki | |
| 2002/0055412 A1 | 5/2002 | Suzuki | |
| 2007/0173374 A1 | 7/2007 | Hayashi | |
| 2009/0118093 A1* | 5/2009 | Heap et al. | 477/110 |

FOREIGN PATENT DOCUMENTS

| | | |
|---|---|---|
| JP | 10-6817 A | 1/1998 |
| JP | 10-59022 A | 3/1998 |
| JP | 2002-144923 A | 5/2002 |
| JP | 3724491 B2 | 12/2005 |

* cited by examiner

*Primary Examiner* — Justin Holmes
(74) *Attorney, Agent, or Firm* — McGinn IP Law Group, PLLC

(57) ABSTRACT

A device for controlling a power transmission device for a vehicle, which, at the time of gearshift, so controls the engine as to rotate at a target rotational speed, wherein at the time of shifting the gear up, a target value properly corresponding to an actual vehicle speed is set to quickly increase the engine output and to shorten the time for shifting the gear. In controlling the engine at the time of shifting the gear up, a target engine rotational speed is set based the signals from, wheel rotational speed detector means that detects the rotational speed of a wheel, such as an anti-lock control device. Thus, the target engine rotational speed is set depending properly upon an actual vehicle speed that varies accompanying an increase in the amount of engaging the clutch at the time of gearshift, and the gear at the time of accelerating the vehicle can be quickly shifted up without accompanied by the shift shock. At the time of shift-down, a target engine rotational speed is set based on an actual vehicle speed found from the signals of the transmission input shaft rotational speed.

11 Claims, 4 Drawing Sheets

DEVICE FOR CONTROLLING A POWER TRANSMISSION DEVICE OF A VEHICLE AT THE TIME OF GEARSHIFT

TECHNICAL FIELD

This invention relates to a device for controlling a power transmission device for a vehicle which is equipped with an engine and a transmission and in which the power from the engine to the transmission is disconnected by an automatic clutch and the like at the time of gearshift. More particularly, the invention relates to controlling the power transmission device at the time of gearshift.

BACKGROUND ART

It is a modern trend of the vehicles to employ a power transmission device for vehicles which automatically executes the shifting operation or the clutch operation for easy driving. A representative example is a so-called automatic transmission (AT) combining a torque converter and a planetary gear type transmission together, i.e., a power transmission device which uses a transmission (MT) of the type of parallel shaft gear mechanism which is the same as that of the so-called manual transmission vehicle in combination with an automatic clutch. In recent years, a power transmission device has been developed for use in vehicles equipped with a diesel engine by interposing a fluid coupling between the engine and the automatic clutch. Upon interposing the fluid coupling, it is made possible to attain smooth start by utilizing the slipping between the pump and the turbine in the fluid coupling at the start of the vehicle and, at the same time, absorbing fluctuation in the engine torque during idling and reducing vibration and noise.

The engine of the power transmission device having the above-mentioned automatic clutch includes an engine control device for determining the fuel feed amount (fuel injection amount) relying upon the amount the accelerator pedal (numeral 62 in FIG. 4) is depressed by a driver and the engine rotational speed. When normally traveling, the fuel injection amount control (accelerator pedal follow-up control) is executed by using the amount the accelerator pedal is depressed as a basic parameter. At the time of gearshift by disengaging the clutch for the shifting operation, the engine control device switches to a control mode for controlling the engine independently of the amount the accelerator pedal is depressed (gearshift engine control) to meet a sudden decrease in the engine load as a result of disengaging the clutch, and reverts to the accelerator pedal follow-up control at a moment when the clutch is engaged. To execute the above controls, the engine control device works in cooperation with a transmission control device that controls the transmission and a clutch control device that controls the clutch. The control mode at the time of gearshift is changed over not being limited in the power transmission device having a fluid coupling interposed therein but also in the power transmission devices for vehicles in general.

FIG. 4 schematically illustrates a conventional power transmission device for a vehicle equipped with a fluid coupling and an automatic clutch. In the power transmission device, a fluid coupling 2 is coupled to the rear of an engine (diesel engine) 1, and a transmission 4 having a parallel shaft gear mechanism is coupled thereto via a clutch (wet multiple disk clutch) 3. An output shaft 41 of the transmission 4 drives the wheels 7 of the vehicle. The fluid coupling 2 works at the start of the vehicle, and includes a lockup clutch 23 for fastening a pump 21 (integral with the output shaft of the engine 1) and a turbine 22 (integral with an input shaft 32 of the clutch 3) together. After the start of the vehicle, when the gear is to be shifted in the transmission 4, the lockup clutch 23 fastens the pump 21 and the turbine 22 together and, therefore, the output shaft of the engine 1 is directly coupled to the input shaft 32 of the clutch 3. The transmission 4 is an ordinary transmission of the type of parallel shaft gear mechanism in which a gear spline integrally formed in the gear meshes with a shift sleeve, and includes a known synchronizing mechanism comprising a transmission input shaft (integral with the output shaft 33 of the clutch 3) and a synchronizer ring. The above power transmission device for vehicles has been disclosed in Japanese Patent No. 3724491 assigned to the present applicant.

At the time of gearshift of the vehicle, the shifting operation is effected by disconnecting the transmission of power from the engine 1 to the transmission 4 by using the clutch 3. Here, the amount the clutch is engaged is controlled depending upon a duty ratio D(%) of the pulse output from the clutch control device 31. Namely, the clutch 3 is completely engaged when the duty ratio is 0% and the amount of engagement becomes zero when the duty ratio is 100% so as to be disengaged. An engine control device 11 provided for the engine 1 controls the engine 1 in cooperation with a clutch control device 31 that controls the amount the clutch 3 is engaged and a shift control device 61 that controls the operation of the transmission 4. To execute these controls, there are arranged a clutch input shaft rotational sensor 51, a transmission input shaft rotational speed sensor 52 and a transmission output shaft rotational sensor 53.

FIG. 5 is a timing diagram illustrating operation characteristics of the control devices at the time of shift-up of the power transmission device of FIG. 4. In FIG. 5, if the vehicle that is traveling at, for example, the second speed is accelerated to increase its speed, the shift control device 61 produces a shift instruction A so as to be shifted to a suitably shifted state, i.e., so as to be shifted to the third speed. Responsive to the shift instruction A that is output, the clutch control device 31 outputs the duty ratio of 100% to disengage the clutch 3 (the actual amount of engagement becomes zero being slightly delayed behind as shown). At a moment the clutch 3 is disengaged, the shift control device 61 disengages the gear of the second speed, places the transmission 4 in the neutral state, and brings the gear into engagement with a gear of the third speed through the synchronizing action by the synchronizing mechanism. The reduction ratio of the transmission is smaller at the third speed than at the second speed. Therefore, in a step where the gear is shifted from the second speed to the third speed by disengaging the clutch 3, the rotational speed of the input shaft of the transmission 4 suddenly decreases down to a rotational speed corresponding to the third speed. At the time of shift-down from the third speed to the second speed during the deceleration of the vehicle, on the other hand, the rotational speed of the input shaft of the transmission 4 suddenly increases.

Responsive to the shifting instruction A that is output, the engine control device 11 changes the control mode from the accelerator pedal follow-up control over to the gearshift engine control, and decreases the amount of fuel injection to meet a sudden decrease in the engine load as a result of disengaging the clutch to prevent the engine rotational speed from sharply increasing. In controlling the engine at the time of gearshift, the amount of fuel injection is, first, decreased stepwise down to the amount of fuel nearly at the time of idling (graduation control) and, thereafter, the amount of fuel is so controlled that the engine rotational speed approaches the rotational speed of the transmission input shaft at the third speed. At the time of shift-down from the third speed to the second speed, the engine rotational speed is controlled to remain in the present state or to increase by a predetermined amount.

At a moment when the gears of the transmission 4 are engaged, the clutch control device 3 starts controlling the clutch 3 so as to be engaged. In controlling the clutch 3 so as to be engaged, the duty ratio is sharply decreased down to about 0% in a short period of time (called "one-shot engagement") and, thereafter, the so-called half-engaged clutch control is executed to return the duty ratio back to the state where the clutch is half-engaged and to gradually decrease the duty ratio again. The duty ratio is set to be nearly 0% for a short period of time from the standpoint of stabilizing the operation of the clutch piston of the clutch (wet multiple disk clutch) 3 to attain the state where the clutch is half-engaged in an early time. The actual amount of engaging the clutch is as shown; i.e., the amount of engagement with which the clutch starts half-engaging is quickly reached and in the state where the clutch is half-engaged, the amount of engagement mildly increases nearly along a change in the duty ratio. This avoids the shift shock and engine stall at the time of engaging the clutch.

As the amount of engagement of the clutch increases in the state where the clutch is half-engaged, the engine rotational speed further decreases, the rotational speed of the transmission input shaft increases, and the two rotational speeds gradually get close to each other. At a moment (B) where the difference has reached a predetermined value, the control mode of the engine control device returns from the engine control at the time of gearshift back to the accelerator pedal follow-up control, and a control operation is executed using the amount the accelerator pedal is depressed by the driver as a basic parameter. At the time of returning back to the accelerator pedal follow-up control, too, the graduation control is executed to increase the amount of fuel injection stepwise.
Patent document 1: Japanese Patent No. 3724491

DISCLOSURE OF THE INVENTION

Problems which the Invention is to Solve

In the gearshift engine control executed by the engine control device at the time of gearshift, the engine rotational speed must be prevented from quickly increasing due to the extinction of the vehicle drive load as a result of disengaging the clutch. When the amount of clutch engagement gradually increases after the gears have been engaged, it is desired to bring, in an early time, the engine rotational speed close to the rotational speed of the input shaft of the transmission that is determined by the selected speed after the gearshift and the traveling speed of the vehicle at that moment, and to quickly finish the clutch engagement and return back to the accelerator pedal follow-up control so that the driver will not feel the gearshift dull yet avoiding the shift shock. In the gearshift engine control, therefore, a target engine rotational speed is determined, and the amount of injecting the fuel to the engine is varied (C in FIG. 5) so that the rotational speed thereof reaches the target value.

The target engine rotational speed is determined by a target value-setting means provided for the shift control device 61. To determine this, the real vehicle speed (actual vehicle speed) that successively varies at the time of gearshift must be detected. At the time of shift-up for accelerating the vehicle, in particular, the actual vehicle speed decreases little by little while the transmission of engine power to the wheels is disconnected by disengaging the clutch. At the time of gradually increasing the amount of engagement in the state where the clutch is half-engaged, therefore, the actual vehicle speed is further increased while quickly recovering the decrease thereof. In this case, the target engine rotational speed is so set as to increase the engine output in an early time in response to an increase in the amount the clutch is engaged in order to overcome the inertial force that accompanies the weight of the vehicle. In order to set the target value, therefore, a vehicle speed that corresponds to the actual vehicle speed must be accurately detected.

At the time of shift-down for decelerating the vehicle, on the other hand, the rotational speed of the transmission input shaft becomes higher than the engine rotational speed. In the state where the clutch is half-engaged, therefore, the amount of engagement is gradually increased by applying the so-called engine brake produced by the pumping loss and the like to the vehicle to thereby decelerate the vehicle. Therefore, the target engine rotational speed does not have to be set by detecting the actual vehicle speed as accurately as that of when shifting the gear up and, rather, the vehicle speed is desirably detected at a position close to the engine.

In the conventional power transmission device shown in FIG. 4, the actual speed of the vehicle is determined based on the rotational speed of the transmission input shaft detected by the sensor 52 and the reduction ratio of the selected speed of the transmission at that moment. Between the transmission input shaft and the wheels, however, there are the transmission 4, a propeller shaft, a final reduction gear (differential gear) and the like, and therefore, the transmission system thereof includes backlash or elastic elements in the rotational direction. If the transmission becomes neutral at the time of gearshift, the reduction ratio of the selected speed of the transmission loses stability for only a short period of time, and the rotational speed of the transmission input shaft fails to correctly represent the actual vehicle speed which successively varies at the time of gearshift. The vehicle speed signal is accurate enough to determine the target engine rotational speed at the time of shift-down but brings about a problem with respect to quick response and accuracy when it is used for controlling the shift-up. In the conventional control device, therefore, the vehicle speed signal has been corrected to determine the target engine rotational speed at the time of shift-up. Despite the correction is effected, however, it became clear that the vehicle speed signal detected by the transmission input shaft rotational speed sensor 52 is not accurate enough when it is attempted to more quickly execute the gearshift without accompanied by shift shock.

The vehicles are usually equipped with a speedometer and it can be considered that the actual speed of the vehicle can be found from the vehicle speed signals of the speedometer. The vehicle speed signals of the speedometer are the signals obtained by detecting the rotational speed of the transmission output shaft coupled to the wheels by using the sensor 53. However, the transmission system between the transmission output shaft and the wheels still includes backlash and the like in the rotational direction. Besides, the vehicle speed signals for the speedometer have been processed such as being passed through a low-pass filter or the like so as to be displayed on the speedometer, and do not quickly vary responsive to the actual vehicle speed at the time of gearshift.

The problem of the present invention is to more quickly execute the gearshift by properly setting a target engine rotational speed that corresponds to the actual vehicle speed at the time of shift-up.

A Means for Solving the Problems

In view of the circumstances that many of the modern vehicles have wheel rotational speed detector means for directly detecting the rotational speed of the wheels, such as being furnished with an anti-lock brake system (ABS) for controlling the brake systems, the present invention sets a target engine rotational speed at the time of shift-up by using signals detected by the wheel rotational speed detector means. That is, the present invention is concerned with "a device for controlling a power transmission device of a vehicle having a clutch between an engine and a transmission mounted on the vehicle, the clutch being equipped with a clutch control device which disengages the clutch at the time of gearshift, wherein:

the vehicle has a wheel rotational speed detector means for detecting the rotational speed of a wheel;

the engine is equipped with an engine control device which controls the engine by using the amount the accelerator pedal is depressed as a basic parameter; and at the time of gearshift, the engine control device switches to a gearshift engine control so that the engine rotates at a target rotational speed independently of the amount the accelerator pedal is depressed; and in the gearshift engine control at the time of shifting the gear up, the target engine rotational speed is set based on a signal detected by the wheel rotational speed detector means.

In the gearshift engine control at the time of shifting the gear down as described in claim 2, the target engine rotational speed can be set based on a detection signal that has detected the rotational speed of the transmission input shaft.

As described in claim 3, it is desired that the transmission is equipped with a shift control device for controlling the operation of the transmission at the time of gearshift, and the shift control device sets the target engine rotational speed in the gearshift engine control and outputs it to the engine control device. As described in claim 4, further, it is desired that the wheel rotational speed detector means is a wheel rotational speed detector means installed in an anti-lock brake system.

Effect Of The Invention

The engine control at the time of gearshift determines a target engine rotational speed and so controls the engine as to rotate at the target rotational speed. At the time of shifting the gear up in the invention, the target engine rotational speed is set based on a signal from the wheel rotational speed detector means that detects the rotational speed of the wheel. The rotational speed of the wheel can be used for directly detecting the actual vehicle speed, and is compared with the vehicle speed signal found from the rotational speed of the transmission input shaft so as to accurately detect the actual vehicle speed without time delay. Therefore, when the clutch is disengaged for gearshift and, thereafter, the amount of engagement is gradually increased in the state where the clutch is half-engaged, it is allowed to so set the target engine rotational speed that the engine output increases in an early time depending properly on the actual vehicle speed that varies accompanying an increase in the amount of engagement. At the time of accelerating the vehicle, therefore, the shift-up can be more quickly executed without accompanied by the shift shock.

In this invention, further, the actual vehicle speed is detected directly from the rotational speed of the wheel, and is used for determining the target engine rotational speed. Therefore, the signal does not have to be corrected unlike that of when using a vehicle speed signal obtained from the rotational speed of the transmission input shaft. Accordingly, a circuit for operating the target engine rotational speed can be simply constructed and, besides, the actual vehicle speed can be correctly detected even when the transmission is in the neutral state.

Modern vehicles are mounting various control devices for improving safety and drivability. Many of them include wheel rotational speed detector means for detecting the rotational speed of a wheel, such as an anti-lock control device for maintaining a braking force by preventing the wheels from locking at the time when the brake is applied or a traction control device for preventing the wheels from slipping on a road of low friction. The rotational speed of the wheel used for the control of the invention turns into a wheel rotational speed detection signal for the control device.

In the gearshift engine control at the time of shifting the gear down as in the invention of claim 2, the target engine rotational speed is set based on a detection signal that has detected the rotational speed of the transmission input shaft. In this case, the target engine rotational speeds at the time of shift-down and shift-up are set based on different signals. Therefore, the target engine rotational speed can be suitably set depending upon the gearshift. At the time of shift-down, the target value can be set for properly controlling the action of the engine brake by using an input shaft rotational speed detection signal of the transmission that directly reflects a change in the engine condition.

In the invention of claim 3, a shift control device for controlling the operation of the transmission is provided with a means for setting a target engine rotational speed in the gearshift engine control, and the target value is output to the engine control device. At the time of gearshift, therefore, the control devices can be systematically executed. As in the invention of claim 4, further, the wheel rotational speed detector means of the invention is desirably a wheel rotational speed detector means installed in the anti-lock brake system.

BEST MODE FOR CARRYING OUT THE INVENTION

Figure 4:
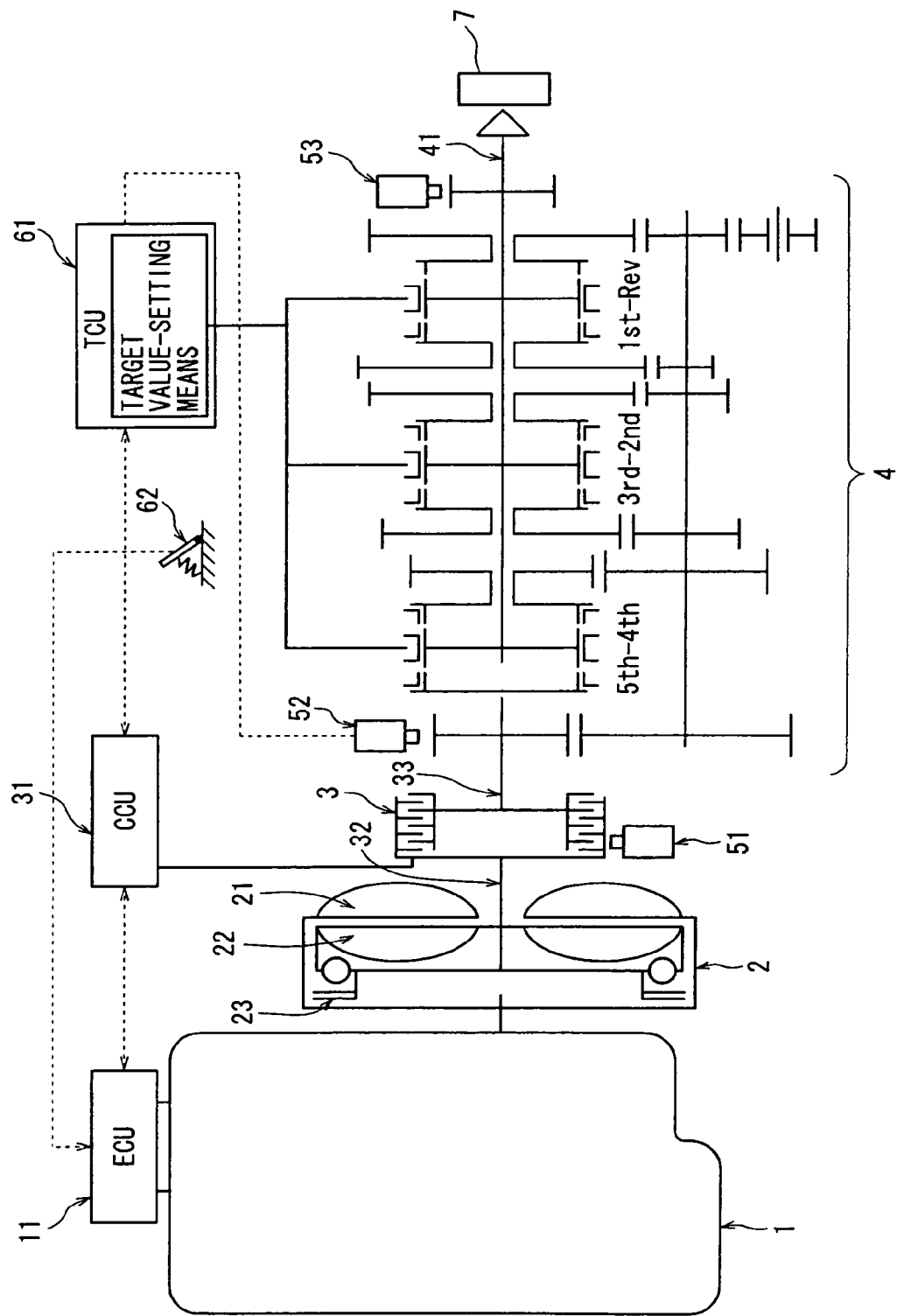
[FIG. 4] is a schematic view of a conventional power transmission device for a vehicle.

The device for controlling the power transmission device for a vehicle by placing the invention in practice will now be described with reference to the drawings. Devices constituting the power transmission device for a vehicle of the invention shown in FIG. 1 and the basic operation thereof are not particularly different from those of the conventional device shown in FIG. 4, and corresponding parts are denoted by putting the same reference numerals.

Figure 1:
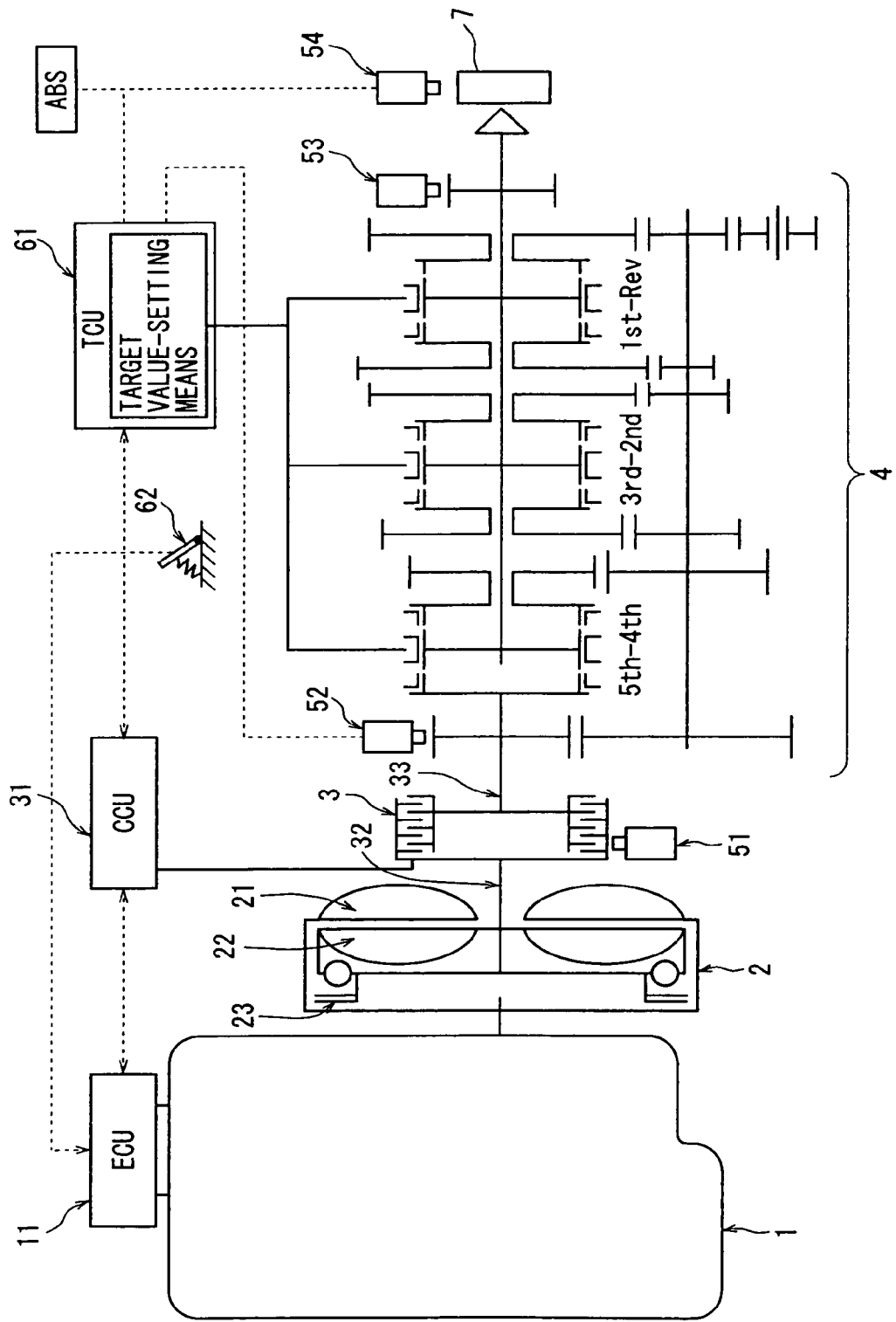
[FIG. 1] is a schematic view of a power transmission device for a vehicle of the present invention.
Figure 5:
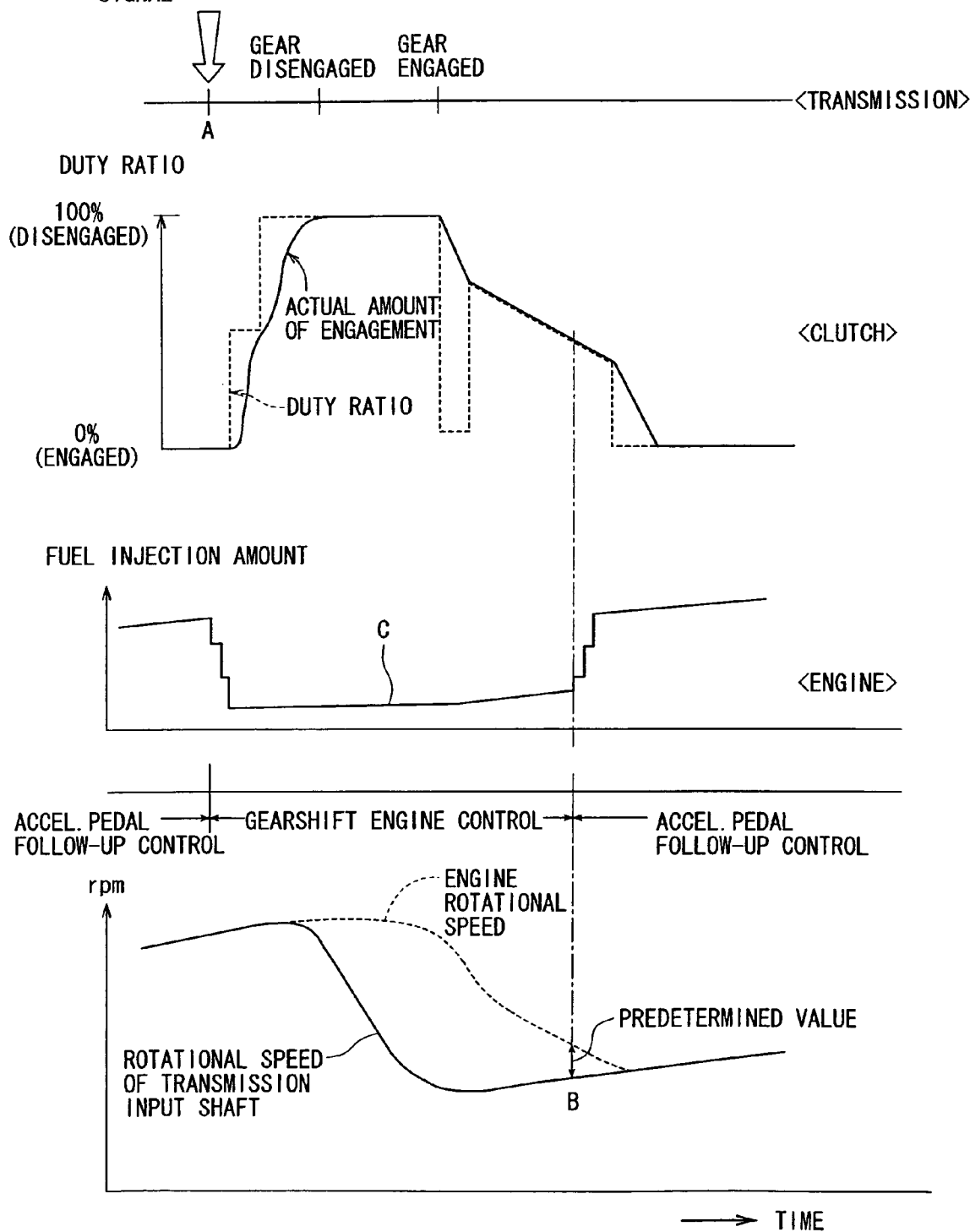
[FIG. 5] is a diagram of timings illustrating the operation of the power transmission device for a vehicle.

In the power transmission device for a vehicle of FIG. 1, a diesel engine 1 is equipped with an engine control device 11, a wet multiple disk clutch 3 is equipped with a clutch control device 31, and a transmission 4 is equipped with a shift control device 61, and these control devices control various devices in cooperation with each other. When normally traveling, the engine control device 11 executes the accelerator pedal follow-up control like the operation characteristics of FIG. 5 and, at the time of gearshift, is changed over to a control mode, i.e., gearshift engine control in response to a gearshift instruction signal. That is, when the gearshift instruction signal is output, the engine control device 11 discontinues the accelerator pedal follow-up control, and switches to the gearshift engine control so that the engine rotates at a target rotational speed independently of the amount the accelerator pedal 62 is depressed. The shift control device 61 is provided with a target value-setting means which operates and determines a target engine rotational speed, and the target value thus set is output to the engine control device 11.

Figure 2:
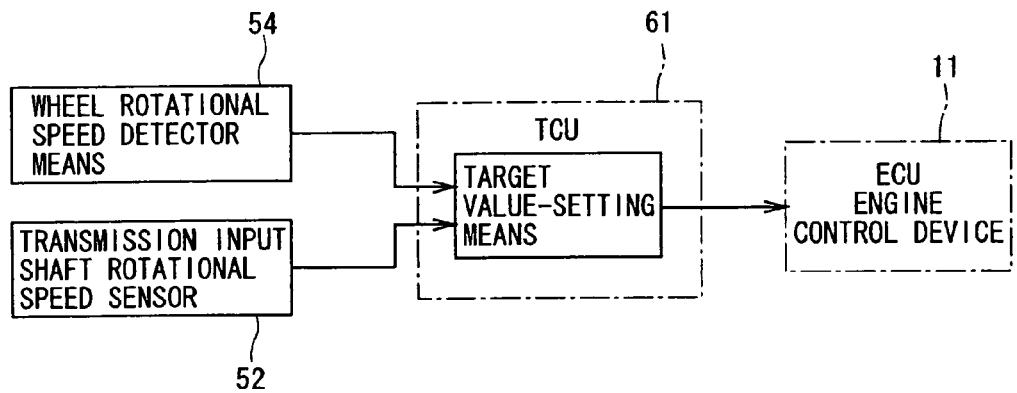
[FIG. 2] is a diagram of a signal system in the power transmission device for a vehicle of the present invention.

The vehicle to which the present invention is applied has an anti-lock brake system (ABS) which is provided in the brake system and which receives a detection signal from a wheel rotational speed detector means 54 that detects the rotational speed of a wheel 7. Referring to FIG. 2, the detection signal from the wheel rotational speed detector means 54 is also input to the shift control device 61 and is used for determining a target engine rotational speed at the time of shift-up. The shift control device 61 is also receiving a rotational speed signal from a sensor 52 that detects the rotational speed of the input shaft of the transmission 4, and uses it for determining a target engine rotational speed at the time of shift-down.

Figure 3:
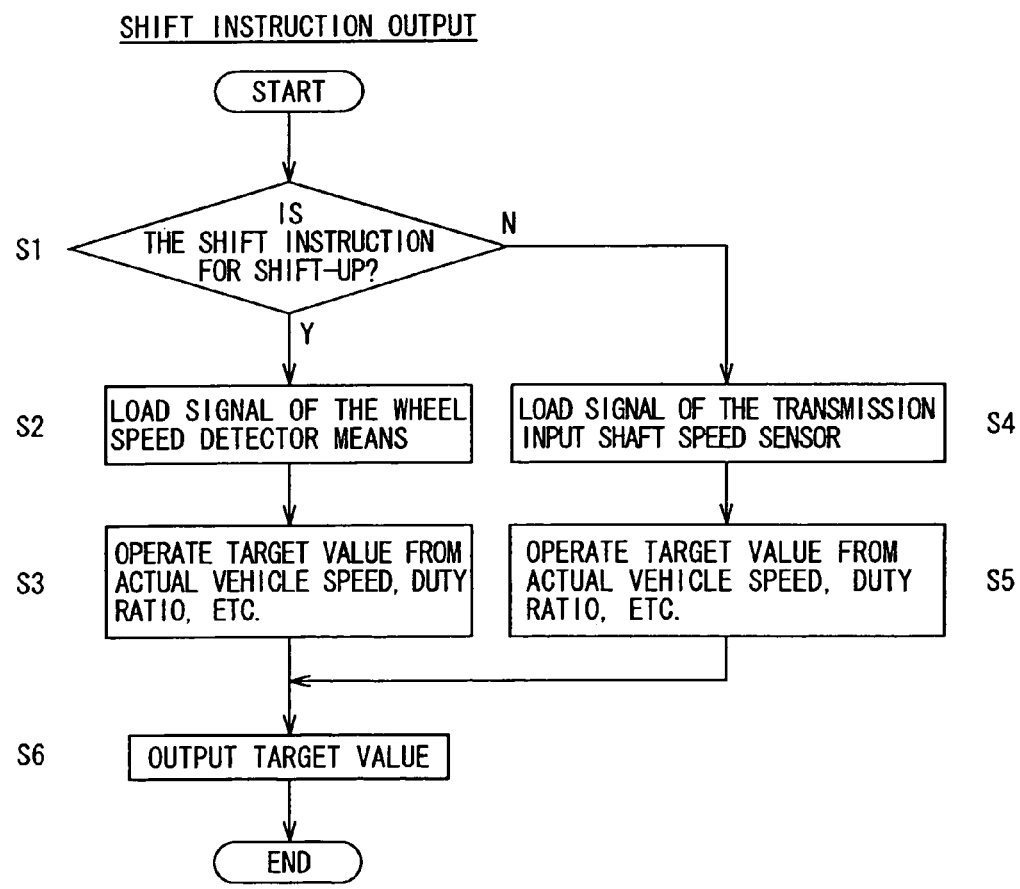
[FIG. 3] is a flowchart illustrating the operations of control devices of the present invention.

Next, described below with reference to a flowchart of FIG. 3 is a procedure for setting the target engine rotational speed in the gearshift engine control according to the invention.

After having output a shift instruction signal, the shift control device 61 starts operating the target engine rotational speed. First, it is decided if the shift instruction is the instruction for shift-up or the instruction for shift-down (S1). If the instruction is for shift-up, a signal is loaded from the wheel rotational speed detector means 54 (S2). The shift control device 61 is receiving an engine rotational speed signal at the present moment, a rotational speed signal of the input shaft of the transmission 4 and a duty ratio signal representing the amount of engagement of the clutch 3 in the state where the clutch is half-engaged. Based on these signals and a signal of an actual vehicle speed from the wheel rotational speed detector means 54, the shift control device 61 operates the target engine rotational speed (S3).

If the shift instruction is the instruction for shift-down, a signal of the rotational speed of the input shaft of the transmission 4 is loaded (S4). Based on the duty ratio signal representing the amount of engagement of the clutch 3 and the actual vehicle speed signal obtained from the rotational speed of the input shaft of the transmission 4, the shift control device 61 operates the target engine rotational speed (S5). The target engine rotational speeds set at steps S3 and S5 are output to the engine control device 11 (S6).

According to the present invention as described above, the shift control device 61 switches the actual vehicle speed detection signal that is used for setting the target engine rotational speed in the gearshift engine control depending upon if the shift instruction is the instruction for shift-up or the instruction for shift-down. It is, therefore, made possible to suitably set the target engine rotational speed depending upon the gearshift. For the shift-up, in particular, there is used a signal from the wheel rotational speed detector means 54 that directly detects the actual vehicle speed. It is, therefore, made possible to so set the target engine rotational speed as to quickly increase the engine output depending properly upon the actual vehicle speed that varies due, for example, to an increase in the amount of engagement in the state where the clutch is half-engaged. At the time of accelerating the vehicle, therefore, the shift-up can be completed in a short period of time without accompanied by the shift shock.

Industrial Applicability

As described above in detail, the present invention is concerned with a device for controlling a power transmission device for a vehicle, which, at the time of gearshift, so controls the engine so as to rotate at a target rotational speed; i.e., the target value is set by using an actual vehicle speed signal obtained from the wheel rotational speed detector means at the time of shift-up to quickly increase the engine output. Though the above embodiment has described the power transmission device for a vehicle mounting the transmission of the type of parallel shaft gear mechanism, the present invention can be applied not only to the above power transmission device but also to the power transmission device for a vehicle equipped, for example, with an automatic transmission (AT) that executes the engine control at the time of gearshift independently of the amount the accelerator pedal is depressed for gearshift. It will, further, be obvious that the embodiment can be modified in various ways, such as obtaining wheel rotational speed signals from the wheel rotational speed detector means for controlling the traction.

The invention claimed is:

1. A device for controlling a power transmission device of a vehicle, comprising a clutch between an engine and a transmission mounted on the vehicle, said clutch being equipped with a clutch control device which disengages said clutch at a time of a gearshift,
    wherein said vehicle comprises a wheel rotational speed detector for detecting directly an actual speed of the vehicle,
    wherein said transmission comprises a shift control device which outputs a shift instruction signal,
    wherein said shift control device comprises a target value-setting means which sets a target engine rotational speed at the time of the gearshift, the target engine rotational speed being set depending on the actual speed of the vehicle detected by the wheel rotational speed detector in a case of a shift-up,
    wherein said engine comprises an engine control device that executes an accelerator follow-up control in which the engine is controlled relying upon an accelerator pedal depression as a basic parameter, and
    wherein, at the time of the gearshift, said engine control device switches to a gearshift engine control in which the engine is controlled to rotate at the target rotational speed set by the target value-setting means.

2. The power transmission device for a vehicle according to claim 1, wherein said vehicle further comprises a transmission input rotational speed detector for detecting a rotational speed of an input shaft of the transmission, and
    wherein the target value-setting means sets the target engine rotational speed depending on the rotational speed of the input shaft detected by the transmission input rotational speed detector in a case of a shift-down.

3. The power transmission device for a vehicle according to claim 1, wherein said shift control device outputs the target engine rotational speed to said engine control device at the time of the gearshift.

4. The power transmission device for a vehicle according to claim , wherein the wheel rotational speed detector is installed in an anti-lock brake system.

5. The power transmission device for a vehicle according to claim 2, wherein said shift control device outputs the target engine rotational speed to said engine control device at the time of the gearshift.

6. The power transmission device for a vehicle according to claim 2, wherein the wheel rotational speed detector is installed in an anti-lock brake system.

7. The power transmission device for a vehicle according to claim 1, wherein, in the shift-up, the target value-setting means sets the target engine rotational speed independent of a rotational speed of an input shaft of the transmission.

8. The power transmission device for a vehicle according to claim 1. wherein, at the time of the gearshift, in the case of the shift-up, the target value-setting means sets the target engine rotational speed based on a signal from the wheel rotational speed detector.

9. The power transmission device for a vehicle according to claim 8. wherein the signal from the wheel rotational speed detector is compared to a vehicle speed signal indicating a rotational speed of an input shaft of the transmission.

10. The power transmission device for a vehicle according to claim 1, wherein said shift control means receives a rotational speed signal from a sensor that detects a rotational speed of an input shaft of the transmission, and applies the rotational speed for determining the target engine rotational speed at a time of a shift-down.

11. The power transmission device for a vehicle according to claim 1, wherein the shift control means switches an actual vehicle speed detection signal that sets the target engine rotational speed in the gearshift engine control depending whether the shift instruction signal is for the shift-up or for a shift-down.

\* \* \* \* \*